(12) United States Patent
Jia et al.

(10) Patent No.: US 11,593,264 B2
(45) Date of Patent: Feb. 28, 2023

(54) METHOD, DEVICE AND COMPUTER PROGRAM PRODUCT FOR STORAGE SYSTEM MANAGEMENT

(71) Applicant: EMC IP Holding Company LLC, Hopkinton, MA (US)

(72) Inventors: Ruiyong Jia, Beijing (CN); Xinlei Xu, Beijing (CN); Yousheng Liu, Beijing (CN); Ping Ge, Beijing (CN); Changyu Feng, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/516,760

(22) Filed: Nov. 2, 2021

(65) Prior Publication Data

US 2022/0327053 A1      Oct. 13, 2022

(30) Foreign Application Priority Data

Apr. 12, 2021      (CN) .......................... 202110390172.4

(51) Int. Cl.
*G06F 12/00*      (2006.01)
*G06F 12/0802*      (2016.01)

(52) U.S. Cl.
CPC ...... *G06F 12/0802* (2013.01); *G06F 2212/72* (2013.01)

(58) Field of Classification Search
CPC ............. G06F 12/0802; G06F 12/0238; G06F 2212/72; G06F 3/065; G06F 3/0683; G06F 3/0689; G06F 11/1446; G06F 11/1471; G06F 11/1076
See application file for complete search history.

(56) References Cited

U.S. PATENT DOCUMENTS

| | | | |
|---|---|---|---|
| 8,341,459 B2 | 12/2012 | Kaushik et al. | |
| 9,256,381 B1 | 2/2016 | Fultz et al. | |
| 10,402,261 B2 | 9/2019 | Sherlock et al. | |
| 10,997,040 B1 | 5/2021 | Xu et al. | |
| 2017/0132081 A1* | 5/2017 | Gladwin | ............. H04L 67/1097 |

* cited by examiner

*Primary Examiner* — Shawn X Gu
(74) *Attorney, Agent, or Firm* — BainwoodHuang

(57) ABSTRACT

Techniques for managing a storage system involve: based on a degree of importance of data stored in a persistent storage device of the storage system, determining key data from the data, wherein a degree of importance of the key data is higher than a threshold degree; respectively identifying first data corresponding to the key data in a first cache of the storage system and second data corresponding to the key data in a second cache of the storage system as non-removable; and in response to corruption of the first data, repairing the first data using the second data in the second cache. Such techniques can avoid system shutdown caused by corruption of key data.

13 Claims, 7 Drawing Sheets

```
typedef enum __attribute__((packed)) _IoCacheRetentionPolicy {
  IO_CACHE_RETENTION_DEFAULT = 0,
  IO_CACHE_RETENTION_DONT_KEEP,
  IO_CACHE_RETENTION_UNRECL
} IoCacheRetentionPolicy;
```

FIG. 4

```
class PCLru
{
  class PerCore
  {
  public:                           ─510
          LRUMultiQueueList    mLru;  ─520  /* Clean LRU list */
          LRUSingleQueueList   mLruMod;     /* Dirty LRU list */
          LRUSingleQueueList   mLruUnreclaim; /* Unreclaimable LRU list */
                                    530
          ...
  }
  ...
}
```

FIG. 5

METHOD, DEVICE AND COMPUTER PROGRAM PRODUCT FOR STORAGE SYSTEM MANAGEMENT

CROSS-REFERENCE TO RELATED APPLICATION

This application claims priority to Chinese Patent Application No. CN 202110390172.4, on file at the China National Intellectual Property Administration (CNIPA), having a filing date of Apr. 12, 2021, and having "METHOD, DEVICE AND COMPUTER PROGRAM PRODUCT FOR STORAGE SYSTEM MANAGEMENT" as a title, the contents and teachings of which are herein incorporated by reference in their entirety.

TECHNICAL FIELD

Embodiments of the present disclosure generally relate to the field of data storage, and in particular, to a method, a device, and a computer program product for managing a storage system.

BACKGROUND

A large amount of data is generally stored in a storage system. For example, a large amount of metadata and user data are stored in the storage system. During use, the data stored in the storage system may be corrupted due to hard disk failures, media errors, software failures, or the like. Some metadata stored in the storage system is very important for the storage system. If such metadata is corrupted, the storage system cannot work normally.

SUMMARY OF THE INVENTION

The embodiments of the present disclosure provide a method, a device, and a computer program product for managing a storage system.

In a first aspect of the present disclosure, a method for managing a storage system is provided. The method includes: based on a degree of importance of data stored in a persistent storage device of the storage system, determining key data from the data, wherein a degree of importance of the key data is higher than a threshold degree; respectively identifying first data corresponding to the key data in a first cache of the storage system and second data corresponding to the key data in a second cache of the storage system as non-removable; and in response to corruption of the first data, repairing the first data using the second data in the second cache.

In a second aspect of the present disclosure, an electronic device is provided. The electronic device includes at least one processing unit and at least one memory. The at least one memory is coupled to the at least one processing unit and stores instructions for execution by the at least one processing unit. The instructions, when executed by the at least one processing unit, cause the electronic device to perform actions. The actions include: based on a degree of importance of data stored in a persistent storage device of a storage system, determining key data from the data, wherein a degree of importance of the key data is higher than a threshold degree; respectively identifying first data corresponding to the key data in a first cache of the storage system and second data corresponding to the key data in a second cache of the storage system as non-removable; and in response to corruption of the first data, repairing the first data using the second data in the second cache.

In a third aspect of the present disclosure, a computer program product is provided. The computer program product is tangibly stored in a non-transitory computer storage medium and includes machine-executable instructions. The machine-executable instructions, when executed by a device, cause this device to implement any step of the method described according to the first aspect of the present disclosure.

The Summary of the Invention part is provided to introduce the selection of concepts in a simplified form, which will be further described in the Detailed Description below. The Summary of the Invention part is neither intended to identify key features or essential features of the present disclosure, nor intended to limit the scope of the present disclosure.

BRIEF DESCRIPTION OF THE DRAWINGS

The above and other objectives, features, and advantages of the present disclosure will become more apparent by describing example embodiments of the present disclosure in further detail with reference to the accompanying drawings, and in the example embodiments of the present disclosure, the same reference numerals generally represent the same components.

FIG. 4 shows an example policy diagram for a cache of a device according to some embodiments of the present disclosure;

FIG. 5 shows another example policy diagram for a cache of a device according to some embodiments of the present disclosure;

In the accompanying drawings, identical or corresponding reference numerals represent identical or corresponding parts.

DETAILED DESCRIPTION

Figure 1:
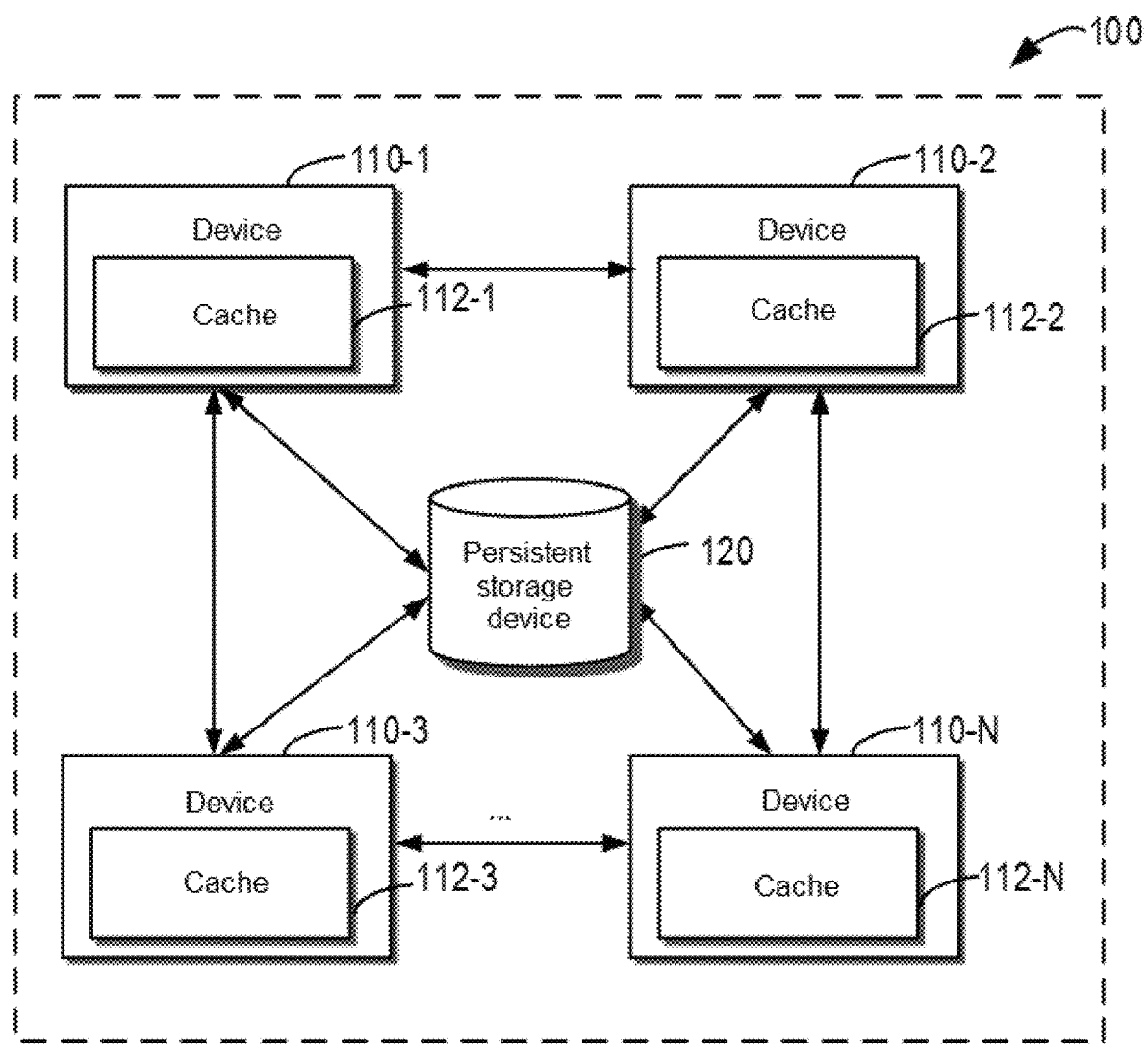
FIG. 1 shows a schematic diagram of an example system in which some embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. While the preferred embodiments of the present disclosure are shown in the accompanying drawings, it should be understood that the present disclosure can be implemented in various forms without being limited to the embodiments set forth herein. Rather, these embodiments are provided to make the present disclosure more thorough and complete and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" denotes "at least one additional embodiment." The terms "first," "second," and the like may refer to different or identical objects. Other explicit and implicit definitions may also be included below.

As set forth, a large amount of metadata and user data are stored in a storage system. These data may be corrupted due to hard disk failures, storage media failures, software failures, and other reasons. If user data is corrupted, it will only affect the access of the user's client terminal to the data itself, and will not affect other devices or other parts of the storage system. However, if some metadata that is very important for the storage system is corrupted, the entire storage system cannot work normally. Generally, important global information is stored in some important metadata. Once corrupted, the metadata is difficult to be reconstructed. Once such metadata is corrupted, the entire storage system cannot work normally, which will cause shutdown of the storage system.

Conventionally, when important metadata is corrupted, a common solution is to cause the storage system to enter a diagnostic mode and use a data recovery tool to manually recover the corrupted metadata. This manual recovery method needs to take a very long time to recover the storage system to normal work. For example, it needs to take several hours or even longer. In addition, in the manual recovery project, the storage system cannot work normally, which affects the normal use of users.

Embodiments of the present disclosure provides a solution for managing a storage system to solve one or more of the above problems and other potential problems. In this solution, based on a degree of importance of data stored in a persistent storage device of the storage system, the data is divided into key data and non-key data. First data corresponding to the key data in a first cache of the storage system and second data corresponding to the key data in a second cache of the storage system are respectively identified as non-removable. If the first data in the first cache is corrupted, the second data in the second cache is used to repair the first data.

The embodiments of the present disclosure can use to repair corrupted data. By using the corresponding data stored in different caches to repair the corrupted data, manual data recovery is not required. In this way, the corrupted data can be quickly recovered, so that the storage system can quickly resume normal work.

The embodiments of the present disclosure will be described in detail below with reference to the accompanying drawings.

FIG. 1 shows a schematic diagram of storage system 100 in which embodiments of the present disclosure may be implemented. Storage system 100 is used to provide tasks related to data storage including, such as storage, data access, and data protection (for example, deduplication, backup, encryption, decryption, etc.). It should be understood that the system shown in FIG. 1 is only an example.

As shown in FIG. 1, storage system 100 includes a plurality of (e.g., N) nodes. The nodes may be implemented by one or more computing devices, computing systems, servers, mainframes, edge devices, etc. Herein, the nodes are also referred to as devices. As shown in FIG. 1, storage system 100 includes devices 110-1, 110-2, 110-3, . . . , and 110-N, where N is an integer greater than 1. For ease of discussion, devices 110-1, 110-2, 110-3, . . . , and 110-N are sometimes referred to collectively or individually as device 110 hereinafter.

Devices 110 include caches 112. For example, device 110-1 includes cache 112-1, device 110-2 includes cache 112-2, . . . , and device 110-N includes cache 112-N. For ease of discussion, caches 112-1, 112-2, 112-3, . . . , and 112-N are sometimes collectively or individually referred to as cache 112. When accessing data, a user client terminal may access cache 112 to obtain the data.

Depending on the storage system used, in some embodiments, storage system 100 may include two devices (i.e., N=2) 110. In some embodiments, storage system 100 may include a scalable multi-device system that includes at least two (i.e., N>2) devices 110. Various devices 110 may be connected to one another using various suitable connection modes, such as a connection through a high-speed network interface. It should be noted that, for clarity, FIG. 1 does not show the coupling of each device 110 to all other devices. For example, the coupling between device 110-1 and device 110-N is not shown. However, such coupling exists according to actual needs.

Storage system 100 further includes persistent storage device 120, and persistent storage device 120 is connected to each device 110. Examples of persistent storage device 120 may include, but are not limited to, hard disk devices, hard disk drives (HDD), redundant arrays of independent disks (RAID), or other hard disk devices. Persistent storage device 120 and each device 110 may be connected using various suitable connection modes, such as a wired connection or a wireless connection. It should be understood that example storage system 100 in FIG. 1 is only illustrative and not limiting. In an actual application, more other devices and/or components in devices may exist in the storage system, or the devices and/or components shown may be arranged in other manners. According to the embodiments of the present disclosure, storage system 100 may be implemented in any suitable manner.

Figure 2:
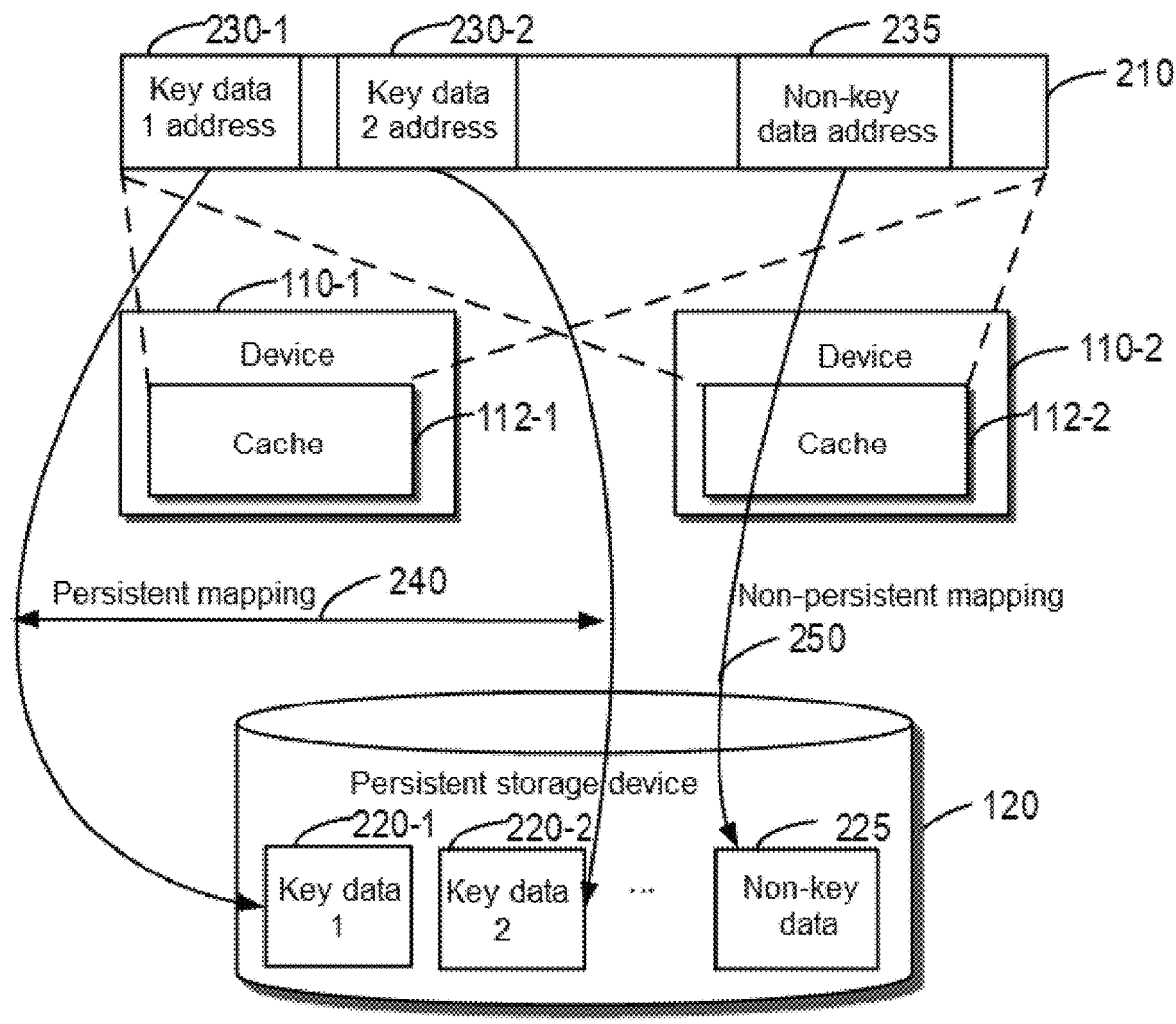
FIG. 2 shows a schematic diagram of a data mapping relationship of an example storage system according to some embodiments of the present disclosure.

FIG. 2 shows a schematic diagram of a data mapping relationship of storage system 100 according to some embodiments of the present disclosure. For ease of discussion, on the basis of example storage system 100 in FIG. 1, the discussion continues on how to implement a method for managing key data of the storage system according to the embodiments of the present disclosure. It should be understood that although only two devices 110 are shown in FIG. 2, this is only illustrative, and storage system 100 may also include any number of devices 110.

As shown in FIG. 2, various pieces of data are stored in persistent storage device 120, such as key data 220-1 and key data 220-2 (collectively or individually referred to as key data 220). Non-key data 225 is also stored in persistent storage device 120. Herein, key data is also referred to as key metadata. It should be understood that although FIG. 2 shows an example of two pieces of key data 220, namely, key data 220-1 and key data 220-2, this is only illustrative, and persistent storage device 120 may store more or less key data 220. It should be noted that key data 220 may be data of any size, such as data blocks and data segments. In some embodiments, key data 220 refers to data having a high degree of importance. Generally, important global information is stored in key data 220. All devices 110 of storage system 100 may access key data 220.

According to some embodiments of the present disclosure, adopting a distributed persistent block mapping (DPBM) mechanism in storage system 100 is proposed. Through the DPBM mechanism, when key data 220 is corrupted, a data mapping relationship between each device 110 and persistent storage device 120 may be used to repair the corrupted key data.

As shown in FIG. 2, the data stored in persistent storage device 120 is associated with global virtual address space 210. Global virtual address space 210 includes addresses of various pieces of data, such as key data address 230-1 and key data address 230-2 (collectively or individually referred to as key data address 230). Global virtual address space 210 further includes non-key data address 235. Each device 110 of storage system 100 may access global virtual address space 210. A mapping between key data 220 in persistent storage device 120 and key data address 230 in global virtual address space 210 is persistent mapping 240. In other words, key data 220 is always associated with the same key data address 230 in global virtual address space 210 during a period from first initialization to shutdown of storage system 100. Non-key data 225 is associated with non-key data address 235 through non-persistent mapping 250. This mapping is not persistent, that is, non-key data 225 may be associated with different non-key data addresses 235 in global virtual address space 210 after each refresh or update.

Each device 110 of storage system 100 is also associated with global virtual address space 210. For key data 220, since it is mapped to unchanged key data address 230 in global virtual address space 210 through persistent mapping 240, cache data associated with key data 220 in cache 112 of each device 110 is always associated with (that is, mapped to) unchanged key data address 230 in global virtual address space 210.

In this way, the embodiments of the present disclosure can establish a DPBM between each device 110 and persistent storage device 120. When key data in cache 120 of certain device 110 is corrupted, the corresponding key data may be obtained, through the DPBM, from cache 120 of another device 110 to repair the corrupted key data.

In some embodiments, the DPBM relationship as shown in FIG. 2 may be used to repair the corrupted key data. Several embodiments of establishing the DPBM relationship and repairing the corrupted key data will be described in more detail below in conjunction with FIG. 3 to FIG. 6.

Figure 3:
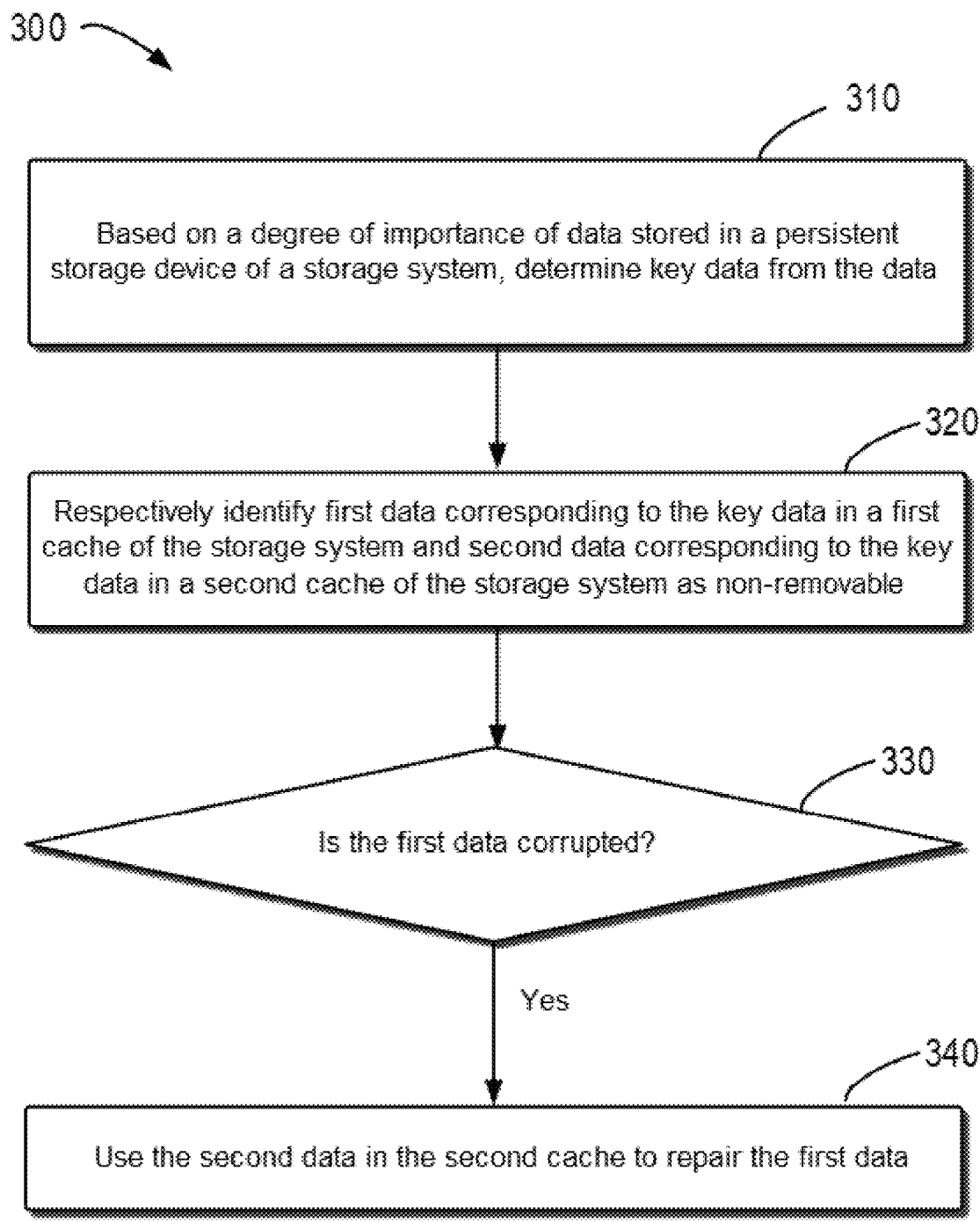
FIG. 3 shows a schematic diagram of an example method for managing a storage system according to some embodiments of the present disclosure.

FIG. 3 shows a flow chart of example method 300 for managing storage system 100 according to some embodiments of the present disclosure. Method 300 may be, for example, executed by storage system 100 as shown in FIG. 1. It should be understood that method 300 may also be executed by other suitable devices or apparatuses. Method 300 may include additional actions not shown and/or may omit actions shown, and the scope of the present disclosure is not limited in this regard. Method 300 is described in detail below in combination with FIG. 1 and FIG. 2.

As shown in FIG. 3, at 310, based on a degree of importance of data stored in persistent storage device 120 of storage system 100, key data 220 is determined from the data. A degree of importance of key data 220 is higher than a threshold degree. For example, the threshold degree of importance may be set according to historical operating data of storage system 100. Those data having the degree of importance higher than the threshold degree are determined as the key data.

In some embodiments, the degree of importance of the data in persistent storage device 120 may also be determined based on information collected from a user client terminal during running of storage system 100. When accessing those key data for the first time, the user client terminal will send feedback information to storage system 100 to indicate the degree of importance of the data. Furthermore, storage system 100 may determine the data as key data 220 according to the feedback information of the user client terminal.

At 320, first data corresponding to key data 220 in a first cache of storage system 100 and second data corresponding to key data 220 in a second cache of storage system 100 are respectively identified as non-removable. For example, first data corresponding to key data 220 in cache 112-1 of device 110-1 is identified as non-removable, and second data corresponding to key data 220 in cache 112-2 of device 110-2 is identified as non-removable.

FIG. 4 shows example cache retention policy 400 that identifies the foregoing first data and second data as non-removable. In FIG. 4, identifier 410 of a new cache retention policy is defined as: IO_CACHE_RETENTION_UNRECL. Identifier 410 is also referred to herein as a non-removable identifier. In some embodiments, identifier 410 is used to identify data in caches 112 that corresponds to key data 220. In some embodiments, when key data 220 is read or written, a function IoSetCacheRetentionPolicy (request, IO_CACHE_RETENTION_UNRECL) will be called.

Additionally or alternatively, in some embodiments, storage system 100 may also determine whether data corresponding to key data 220 is stored in the first cache and the second cache. If it is determined that no data corresponding to key data 220 is stored in the first cache and the second cache, data corresponding to key data 220 is respectively stored to the first cache and the second cache as first data and second data. For example, if no data corresponding to key data 220 is stored in cache 112-1 of device 110-1 and cache 112-2 of device 110-2, the data corresponding to key data 220 is respectively stored into cache 112-1 and cache 112-2 as the first data and the second data.

For example, when storage system 100 is just started up, no data is held on cache 112 of device 110. In this case, when device 110 intends to access certain piece of key data 220, cache 112 of that device does not store data corresponding to key data 220. In this case, storage system 100 will store the data corresponding to key data 220 into cache 112-1 and cache 112-2 as first data and second data, respectively.

In addition, storage system 100 may also identify the first data and the second data as non-removable. For example, the first data and the second data respectively stored into cache 112-1 and cache 112-2 are respectively identified as identifier 410 shown in FIG. 4.

At 330, it is determined whether the first data is corrupted. For example, whether the first data in cache 112-1 of device 110-2 is corrupted is determined through check. It should be understood that various appropriate check methods may be used to check the first data. For example, the check methods include but are not limited to parity check, exclusive OR check, cyclic redundancy check, and the like.

If it is determined at 330 that the first data is corrupted, method 300 proceeds to 340. At 340, the second data in the second cache is used to repair the first data. For example, the second data in cache 112-2 of device 110-2 is used to repair the first data in cache 112-1 of device 110-1.

Additionally or alternatively, the second data in the second cache may also be checked to determine whether the second data used to repair the first data is corrupted. It should be understood that various appropriate check methods may be used to check the second data. For example, the check methods include but are not limited to parity check, exclusive OR check, cyclic redundancy check, and the like.

Additionally or alternatively, in some embodiments, storage system 100 may obtain the second data in the second cache based on a mapping between non-removable data in the first cache and non-removable data in the second cache as well as the first data. Storage system 100 may use the second data to repair the corrupted first data. The mapping between the non-removable data in the first cache and the non-removable data in the second cache may be established through the mapping relationship shown in FIG. 2. For example, as shown in FIG. 2, the non-removable data in cache 112-1 and the non-removable data in cache 112-2 are both mapped to the same key data address 230 in global virtual address space 210. Therefore, a one-to-one mapping relationship is established between the non-removable data in the first cache and the non-removable data in the second cache. When the first data in the first cache (for example, cache 112-1) is corrupted, the second data corresponding thereto is obtained in the second cache (for example, cache 112-2) through the one-to-one mapping relationship. In this way, the corrupted first data may be repaired using the second data.

In the above manner, the DPBM mechanism as described in the present disclosure may be used to repair the corrupted key data, thereby avoiding storage system failures or storage system shutdown caused by key data corruption.

Additionally or alternatively, in response to the first data in the first cache being updated, storage system 100 may update the second data in the second cache based on the updated first data. For example, when first data in cache 112-1 is updated, storage system 100 may check the first data. If it is checked that the updated first data is normal data instead of corrupted data, storage system 100 will use the updated first data to update the second data corresponding thereto in cache 112-2. It should be understood that the first data and the second data described herein are respectively associated with the same key data 220 through the persistent mapping.

In some embodiments, in response to the second data in the second cache being updated, storage system 100 may update the first data in the first cache based on the updated second data. For example, storage system 100 may perform a process, similar to the above-described process, of updating the second data based on the updated first data.

Additionally or alternatively, storage system 100 may update associated key data 220 in persistent storage device 210 at predetermined cycles using at least one of the first data and the second data. This process will be described in more detail below in conjunction with FIG. 4 to FIG. 6.

FIG. 5 shows another example policy diagram for cache 112 of device 110 according to some embodiments of the present disclosure. FIG. 5 shows a new least recently used (LRU) policy. According to the policy shown in FIG. 5, data in cache 112 may be divided into different lists. For example, field 510 mLru in FIG. 5 indicates that the data belongs to a clean data list. Field 520 mLruMod indicates that the data belongs to a dirty data list. Field 530 mLruUnreclaim indicates that the data belongs to a non-removable data list. Herein, the non-removable data list may also be referred to as a non-recoverable data list.

The non-removable data list indicated by field 530 has the following characteristics: the data in the list belongs to clean data, but the data in the list will not be removed from cache 112 unless it is removed from storage system 100. The data in the non-removable data list corresponds to key data 220 in persistent storage device 120. The data in the non-removable lists among caches 112 of various devices 110 is synchronized and consistent.

Figure 6:
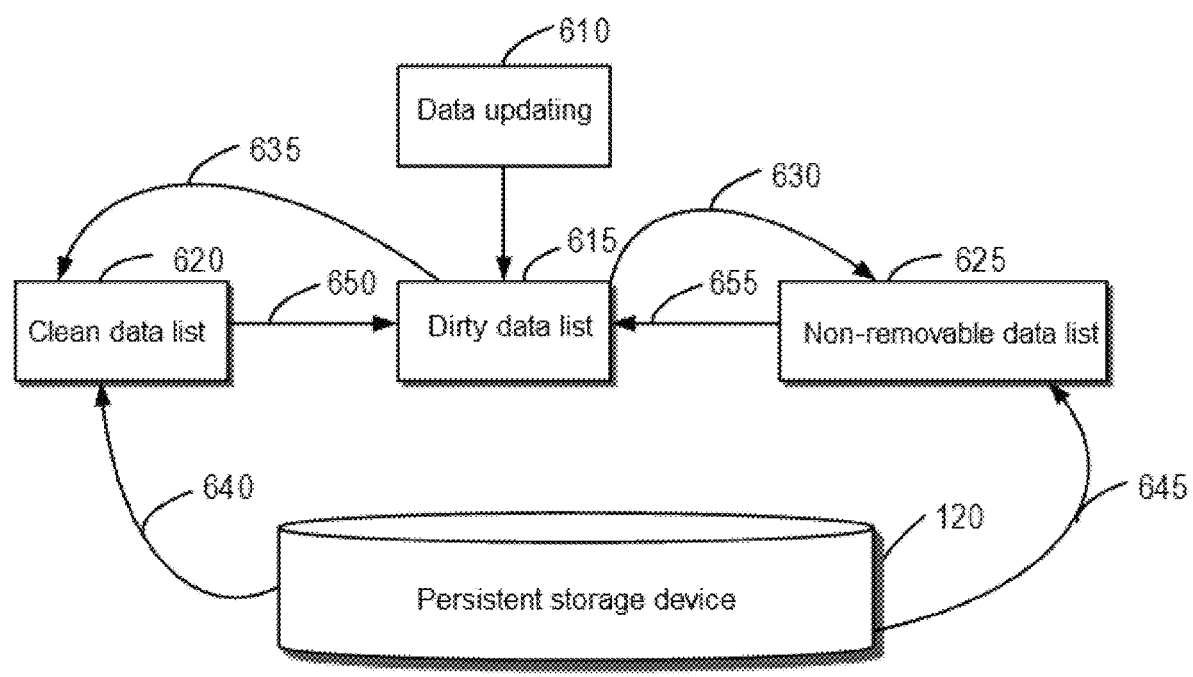
FIG. 6 shows a schematic diagram of processing a cache of a device according to some embodiments of the present disclosure.

FIG. 6 shows a diagram of data transmission relationship between various LRU data lists in caches 112 and persistent storage device 120 described in FIG. 5. FIG. 6 shows operation 640 and operation 650 that will occur when storage system 100 is just started up. When storage system 100 is started up, there is no data in cache 112. When a user accesses a certain piece of data in storage system 100 for the first time, since there is no data in cache 112, the user needs to access persistent storage device 120 to obtain the data. If the data accessed by the user for the first time has a non-removable identifier, the data may be stored into non-removable data list 625 in cache 112 through operation 645. If the data accessed by the user for the first time does not have a non-removable identifier, the data may be stored into clean data list 620 in cache 112 through operation 640. With reference to FIG. 5, the data in non-removable data list 625 in cache 112 may be identified with field 530 (i.e., mLruUnreclaim). The data in clean data list 620 in cache 112 may be identified with field 510 (i.e., mLru).

As shown in FIG. 6, the user can perform an operation of data updating 610 on cache 112. The updated data is stored in dirty data list 615. The data in dirty data list 615 in cache 112 may be identified with field 520 (i.e., mLruMod). The data in dirty data list 615 will not be removed from cache 112 before it is updated into persistent data store 120. If the data updated by the user through data updating 610 has a non-removable identifier (for example, identifier 410), the data is rewritten from non-removable data list 625 to dirty data list 615 through 655. Otherwise, if the data does not have a non-removable identifier, the data is rewritten from clean data list 620 to dirty data list 615 through 650.

As described above, if the user performs the operation of data updating 610 on cache 112-1 and the updated data has a non-removable identifier, the data corresponding thereto in cache 112-2 will also be updated synchronously. In some embodiments, storage system 100 may be configured to use the above-mentioned updated data in cache 112-1 or 112-2 to update corresponding key data 220 in persistent storage device 120 every predetermined cycle, for example, 100 milliseconds. After the data with the non-removable identifier in dirty data list 615 has been updated to persistent storage device 120, it can be moved to non-removable data list 625 through 630. The data in non-removable data list 625 will not be removed from cache 112.

In contrast, if the user performs the operation of data updating 610 on cache 112-1 and the updated data does not have a non-removable identifier, then after the updated data is written to persistent storage device 120, the data will be moved to clean data list 620 through 635. The data in clean data list 620 may be removed from cache 112.

In some embodiments, when such data that does not have a non-removable identifier in cache 112-1 is corrupted, since the data may have been removed from cache 112-2, corresponding data needs to be obtained from persistent storage device 120 to repair the data. In this way, data with a low degree of importance will not be protected by the persistent mapping relationship and the non-removable data list. Therefore, the waste of cache resources and computing resources can be avoided. Storage system 100 may perform data repair on such data during its idle time or later, thereby avoiding affecting the running of storage system 100.

It should be understood that a cycle of 100 ms described above is merely illustrative and not limiting. In some embodiments, other cycle lengths may also be selected.

In this way, it can be ensured that the data corresponding to key data 220 in each cache 112 can always be kept in cache 112 without being removed. In addition, the non-removable data lists in various caches 112 are synchronized and consistent. In this way, when the first data corresponding to key data 220 in cache 112-1 is corrupted, the corrupted first data may be repaired through corresponding second data in another cache 112-2. In this way, it is possible to avoid working failures or even shutdown of storage system 100 caused by data corruption.

Compared with conventional storage technologies, such as a RAID technology, the technical solution of the present disclosure has many advantages. For example, some storage systems use RAID 6 and 3-mode mirroring to protect data. At that time, write performances of such storage systems were poor and the disk utilization capacity was wasted. With the solution of the present disclosure, a storage system based on RAID 5 and 2-mode RAID 1 may be used. With this system, better write performance and more efficient disk utilization may be provided.

In addition, in some storage systems, such as a RAID system using 3-mode mirroring, all metadata in the storage system is protected. As set forth above, some data in the metadata is not of high importance. If the data not of high importance (that is, non-key data) is corrupted, even if the data is not repaired, normal operation of the storage system may not be affected greatly. On the contrary, protection and repair of non-key data may occupy cache resources and computing resources of the storage system, which can affect the performance of the storage system.

By contrast, with the technical solution of the present disclosure, only the data having a high degree of importance is persistently protected and repaired. In this way, the waste of cache resources and storage resources can be avoided, and the performance of the storage system can be further optimized.

In addition, it should be understood that the solution described herein is not only applicable to metadata in a storage system. The solution described herein may also be used to protect a lot of other data, such as namespace data. The scope of the present disclosure is not limited herein.

Figure 7:
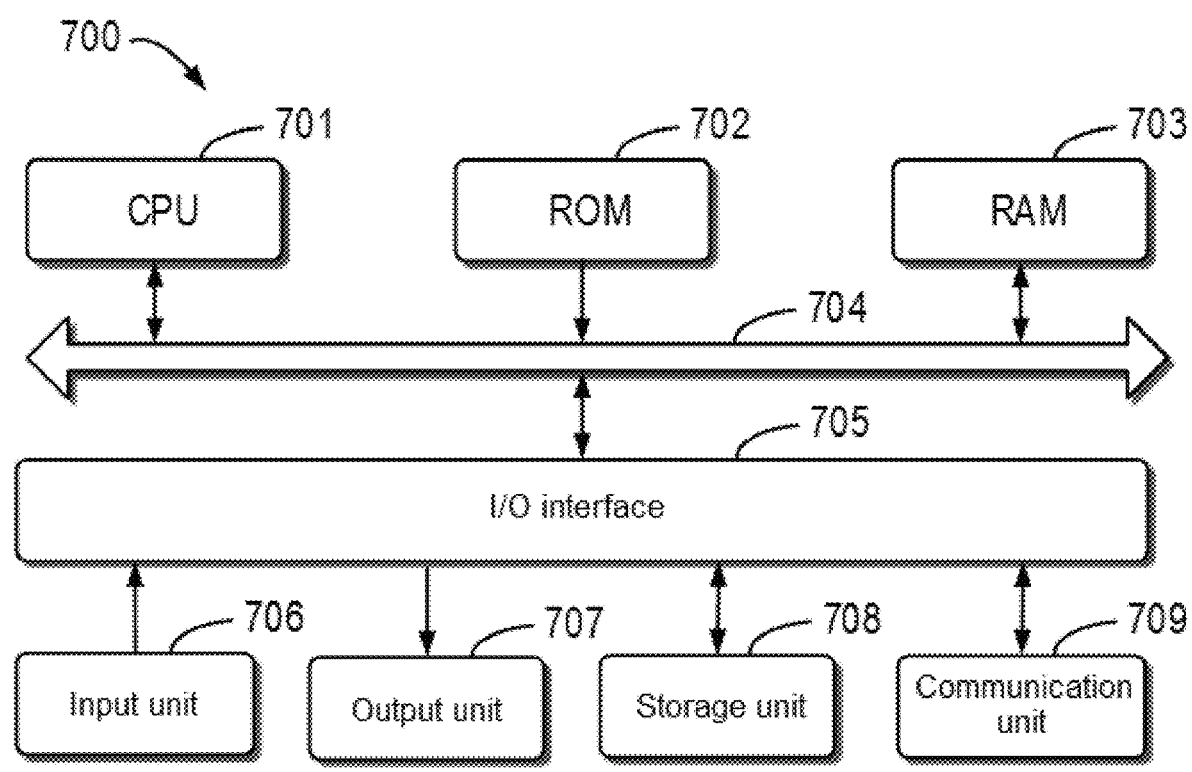
FIG. 7 shows a schematic block diagram of an example device that can be used to implement an embodiment of the present disclosure.

FIG. 7 shows a schematic block diagram of example device 700 that can be configured to implement an embodiment of the present disclosure. For example, storage system 100 as shown in FIG. 1 may be implemented by device 700. As shown in FIG. 7, device 700 includes central processing unit (CPU) 701 that may perform various appropriate actions and processings according to computer program instructions stored in read-only memory (ROM) 702 or computer program instructions loaded from storage unit 708 to random access memory (RAM) 703. In RAM 703, various programs and data required for the operation of device 700 may also be stored. CPU 701, ROM 702, and RAM 703 are connected to one another through bus 704. Input/output (I/O) interface 705 is also connected to bus 704.

Multiple components in device 700 are connected to I/O interface 705, including: input unit 706, such as a keyboard and a mouse; output unit 707, such as various types of displays and speakers; storage unit 708, such as a magnetic disk and an optical disk; and communication unit 709, such as a network card, a modem, and a wireless communication transceiver. Communication unit 709 allows device 700 to exchange information/data with other devices via a computer network, such as the Internet, and/or various telecommunication networks.

The various processes and processing procedures described above, such as method 300, may be performed by CPU 701. For example, in some embodiments, method 300 may be implemented as a computer software program that is tangibly included in a machine-readable medium such as storage unit 708. In some embodiments, part or all of the computer program may be loaded and/or installed onto device 700 via ROM 702 and/or communication unit 709. When the computer program is loaded into RAM 703 and executed by CPU 701, one or more actions of method 300 described above may be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical encoding device such as a punch card or a raised structure in a groove having instructions stored thereon, and any suitable combination thereof. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, state setting data, or source code or object code written in any combination of one or more programming languages, the programming languages including object-oriented programming languages, such as Smalltalk, C++, and the like, and conventional procedural programming languages, such as the C language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer may be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), may be customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product according to the embodiments of the present disclosure. It should be understood that each block of the flow charts and/or block diagrams and combinations of blocks in the flow charts and/or block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms used herein is intended to best explain the principles and practical applications of the embodiments or the improvements to technologies on the market, or to enable other persons of ordinary skill in the art to understand the embodiments disclosed herein.

The invention claimed is:

1. A method for managing a storage system, comprising:
   based on a degree of importance of data stored in a persistent storage device of the storage system, determining key data from the data, wherein a degree of importance of the key data is higher than a threshold degree;
   respectively identifying first data corresponding to the key data in a first cache of the storage system and second data corresponding to the key data in a second cache of the storage system as non-removable; and
   in response to corruption of the first data, repairing the first data using the second data in the second cache.

2. The method according to claim 1, wherein repairing the first data using the second data in the second cache comprises:
   based on a mapping between non-removable data in the first cache and non-removable data in the second cache as well as the first data, obtaining the second data in the second cache; and
   repairing the first data using the second data.

3. The method according to claim 1, wherein identifying the first data and the second data as non-removable comprises:
   determining whether data corresponding to the key data is stored in the first cache and the second cache;
   if it is determined that no data corresponding to the key data is stored in the first cache and the second cache, respectively storing data corresponding to the key data to the first cache and the second cache as the first data and the second data; and
   respectively identifying the first data and the second data as non-removable.

4. The method according to claim 1, further comprising at least one of the following:
   in response to the first data in the first cache being updated, updating the second data in the second cache based on the updated first data; and in response to the second data in the second cache being updated, updating the first data in the first cache based on the updated second data.

5. The method according to claim 1, further comprising: updating the key data in the persistent storage device at predetermined cycles using at least one of the first data and the second data.

6. The method according to claim 1, further comprising: if it is determined that third data that is not identified as non-removable in the first cache is corrupted, obtaining fourth data corresponding to the third data from the persistent storage device; and repairing the third data using the fourth data.

7. An electronic device, comprising:
at least one processor; and
at least one memory storing computer program instructions, wherein the at least one memory and the computer program instructions are configured to cause, together with the at least one processor, the electronic device to perform actions comprising:
based on a degree of importance of data stored in a persistent storage device of the storage system, determining key data from the data, wherein a degree of importance of the key data is higher than a threshold degree;
respectively identifying first data corresponding to the key data in a first cache of the storage system and second data corresponding to the key data in a second cache of the storage system as non-removable; and
in response to corruption of the first data, repairing the first data using the second data in the second cache.

8. The electronic device according to claim 7, wherein repairing the first data using the second data in the second cache comprises:
based on a mapping between non-removable data in the first cache and non-removable data in the second cache as well as the first data, obtaining the second data in the second cache; and
repairing the first data using the second data.

9. The electronic device according to claim 7, wherein identifying the first data and the second data as non-removable comprises:
determining whether data corresponding to the key data is stored in the first cache and the second cache;
if it is determined that no data corresponding to the key data is stored in the first cache and the second cache, respectively storing data corresponding to the key data to the first cache and the second cache as the first data and the second data; and
respectively identifying the first data and the second data as non-removable.

10. The electronic device according to claim 7, wherein the actions further comprise at least one of the following:
in response to the first data in the first cache being updated, updating the second data in the second cache based on the updated first data; and
in response to the second data in the second cache being updated, updating the first data in the first cache based on the updated second data.

11. The electronic device according to claim 7, wherein the actions further comprise:
updating the key data in the persistent storage device at predetermined cycles using at least one of the first data and the second data.

12. The electronic device according to claim 7, wherein the actions further comprise:
if it is determined that third data that is not identified as non-removable in the first cache is corrupted, obtaining fourth data corresponding to the third data from the persistent storage device; and
repairing the third data using the fourth data.

13. A computer program product having a non-transitory computer readable medium which stores a set of instructions to manage a storage system; the set of instructions, when carried out by computerized circuitry, causing the computerized circuitry to perform a method of:
based on a degree of importance of data stored in a persistent storage device of the storage system, determining key data from the data, wherein a degree of importance of the key data is higher than a threshold degree;
respectively identifying first data corresponding to the key data in a first cache of the storage system and second data corresponding to the key data in a second cache of the storage system as non-removable; and
in response to corruption of the first data, repairing the first data using the second data in the second cache.

* * * * *